United States Patent [19]

Rothschild et al.

[11] Patent Number: 5,435,887

[45] Date of Patent: Jul. 25, 1995

[54] METHODS FOR THE FABRICATION OF MICROSTRUCTURE ARRAYS

[75] Inventors: Mordechai Rothschild, Newton; Anthony Forte, Chelmsford, both of Mass.

[73] Assignee: Massachusetts Institute of Technology, Cambridge, Mass.

[21] Appl. No.: 146,926

[22] Filed: Nov. 3, 1993

[51] Int. Cl.[6] .................. B44C 1/22; B29C 37/00; C03C 15/00

[52] U.S. Cl. .................. 216/26 W GW; 216/13; 216/48

[58] Field of Search ............ 156/649, 656, 657, 659.1, 156/662, 663, 667, 668; 359/642

[56] References Cited

U.S. PATENT DOCUMENTS 5,198,073 3/1993 Ishibashi .................. 156/659.1
5,286,338 2/1994 Feldblum et al. .................. 156/643

OTHER PUBLICATIONS

T. Chia and L. L. Hench, Micro-Arrays by Laser Densification of Gel-Silica Matrices, 1992, pp. 215-226, SPIE vol. 1758 Sol-Gel Optics II.

*Primary Examiner*—William Powell
*Attorney, Agent, or Firm*—Wolf, Greenfield & Sacks

[57] ABSTRACT

A method is provided for fabricating smoothly-curved microstructures such as microlenses on a substrate and certain unique microstructures and microstructure arrays obtained through use of such techniques are also provided. The substrate may be smoothly-curved and the bases of the microstructures may have a variety of shapes. The method takes advantage of the surface tension of a liquid to form droplets having a desired shape over high surface energy portions or area of the substrate, which substrate has been previously patterned to have areas with surface energies which are above and below, respectively, the surface tension of a liquid deposited to form the droplets. The formed droplets may then be cured to create the desired microstructures.

22 Claims, 3 Drawing Sheets

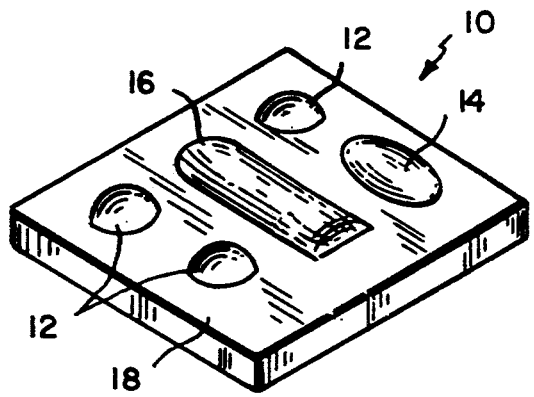
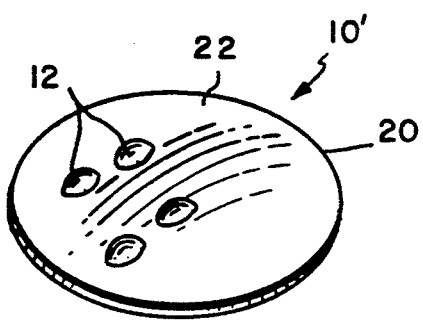
FIG. 1
FIG. 2
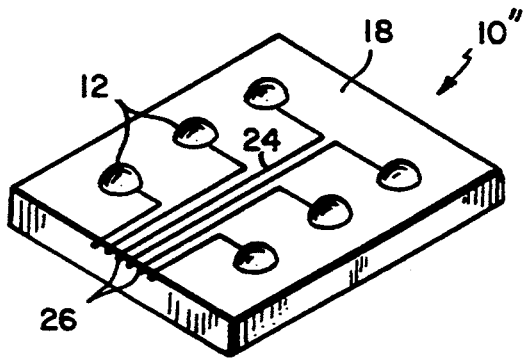
FIG. 3
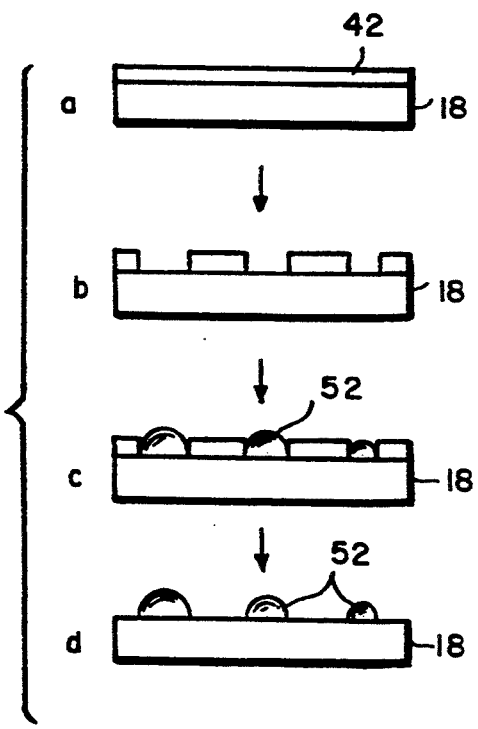
FIG. 5

METHODS FOR THE FABRICATION OF MICROSTRUCTURE ARRAYS

FIELD OF THE INVENTION

This invention relates to methods for fabricating one or more smoothly curved microstructures on a substrate, such as for example microlens arrays, and to selected such microstructure arrays.

BACKGROUND OF THE INVENTION

There are many optical and electro-optical applications where a microlens array or other array of one or more smoothly curved microstructures may be advantageously utilized. Microlenses for example find application in integrated optics applications such as for redirecting and focusing light waves confined along a waveguide. In microoptics, such lens arrays may be used for focusing, imaging or transmitting optical beams. Such arrays may also find application as phase shifting masks, laser beam homogenizers, or, where electrically conductive microstructures are employed, as the elements of flat panel displays.

However, the utility of such microstructures has heretofore been limited by limitations in techniques available for the fabrication thereof. For example, while the base diameter of each microlens or other microstructure may be 100 micrometers or more, there are applications where lenses or other structures of submicrometer size are desirable. Current techniques for fabricating microstructures are not capable of achieving dimensions much less than one micrometer. Current techniques, which frequently involve etching, also have trouble in avoiding interaction where structures are closely spaced and cannot be used with materials such as tin oxide or tungsten oxide which are difficult to etch and cannot otherwise be easily shaped. Tungsten oxide is a particularly desirable material in some applications since it is electrochromic conductive, changing color based on the current applied thereto. This is advantageous, for example, in producing flat screen displays.

Another limitation on existing techniques, using for example lithographic techniques for generating the microlens, is that the lens can only be formed on a flat substrate. However, there are applications, such as with contact lenses, where it may be desirable to form the microlens or other microstructures on a smoothly curved surface.

Still another limitation on microlenses formed using existing techniques is that it is not possible to achieve extremely smooth lens surfaces, resulting in microlenses of less than optimal quality. There are applications for microlenses where higher quality lens would be desirable. A further limitation with existing techniques is that they are generally limited to forming domed or hemispherical microstructures and are not easily adapted for forming structures having other shapes. Again, there are applications where microstructures having other shapes are desirable. Finally, existing techniques are relatively expensive and time consuming and often require skilled operators to achieve satisfactory results. A faster, less expensive technique for forming microstructures which is easier to practice and to automate is therefore desirable.

SUMMARY OF THE INVENTION

In accordance with the above, this invention provides an improved method for fabricating smoothly curved microstructures such as microlenses, on a substrate as well as certain unique microstructures and microstructure arrays obtained through the use of such techniques.

More specifically, these methods for fabricating at least one smoothly curved microstructure on a substrate involve the steps of (a) forming a thin film pattern on the substrate having material with a first surface energy in first areas, which areas are to underlie a microstructure, and having material with a second lower surface energy in remaining areas of the substrate; (b) depositing a liquid on the patterned substrate, which liquid has a surface tension which is lower than the first surface energy but higher than the second surface energy, the liquid adhering primarily to the first areas of the substrate to form a droplet for each microstructure, each droplet having a smoothly curved profile which corresponds to that of the corresponding microstructure, and each droplet containing a selected curable compound; and (c) curing the droplets to form the microstructures on the substrate. The curing step may include the step of permitting the droplets to harden over a period of time and may for example be effected or accelerated by heating the droplets and/or by radiating the droplets with a selected radiation. The depositing step may involve depositing a curable compound having selected optical and/or selected electrical properties, and in particular, depositing a compound having a selected electric conductivity. In order to achieve structures which are not dome-shaped, at least one of the first areas which is formed may be non-circular.

Where the substrate is formed of material having the second surface energy, the forming step includes forming a thin film of material having the first surface energy on the substrate in the first areas. Conversely, where the substrate is formed of the material having the first surface energy, the forming step includes forming a thin film of material having the second surface energy on the substrate in the second areas. More particularly, the forming step for the second embodiment preferably includes forming a thin film hydrophobic layer on the substrate, which film is patterned to provide non-hydrophobic material in said first areas, the liquid being deposited during the depositing step including water. Typically, when this technique is employed, the remaining hydrophobic layer is removed from the substrate after the depositing of the liquid has been completed or after the curing step has been completed. Alternatively, the forming step may include laying down a thin film of a photoresistant material on the substrate, rendering the film hydrophobic, and removing the hydrophobic layer over the first areas. The removal of the hydrophobic layer over the first area may for example be accomplished by lithographic etching. For a preferred embodiment, the thin film hydrophobic layer is a spun-on film of Teflon synthetic resin polymer, preferably AF.

For some embodiments of the invention, the substrate has a smooth curved surface, with this surface being the surface of a contact lens for certain embodiments. Where the surface is a surface of a contact lens, the areas of the substrate are patterned to correct for a selected occular defect of a patient.

For another embodiment of the invention, the depositing step includes providing a vapor to the patterned substrate of a liquid which selectively adheres to film-free areas of the substrate in the form of droplets, the vapor also including a metal halide and/or a silicon halide, the vapor reacting chemically to form a solid oxide in the shape of the droplets; and removing any remedial halide product. Alternatively, the depositing step may include the step of exposing the patterned substrate to a silicon-containing liquid or to a metal containing liquid. Where a silicon containing liquid is to be deposited, the patterned substrate may be exposed to a silicon containing compound in an organic solvent, the compound adhering to film-free areas of the substrate in the form of droplets. The solvent is then evaporated. A desired size and shape for the structures may be achieved by repeating the depositing and curing steps a selected number of times.

The invention also includes a microstructure array having a smoothly curved substrate with a plurality of smoothly curved microstructures formed in a predetermined pattern on the substrate. For some embodiments of the invention the structures are an array of microlenses. More particularly, for some such embodiments of the invention the substrate is a surface of a contact lens, the structures being formed on the lens surface in a pattern to correct a selected occular defect.

The invention also involves the apparatus formed by performing the method described above. In particular, the microstructures may be formed of a compound having a selected electrical conductivity. For example, the compound may include tungsten oxide which is electrochromic and the apparatus may include electrical leads to selectively apply electric currents to the tungsten oxide structures. The compounds for other structures may be selected to have desired optical properties. The microstructures may also be formed on a curved substrate and/or the microstructures may have a non-spherical shape.

The foregoing other objects, features and advantages of the invention will be apparent from the following more particular description of preferred embodiments of the invention as illustrated in the accompanying drawings.

IN THE DRAWINGS

FIG. 1 is a perspective view of an illustrative microstructure array which may be formed in accordance with the teachings of this invention.

FIG. 2 is a perspective view of a contact lens having a microlens array form thereon in accordance with the teachings of this invention.

FIG. 3 is a perspective view of an electrically controlled microlens array.

Figure 4A:
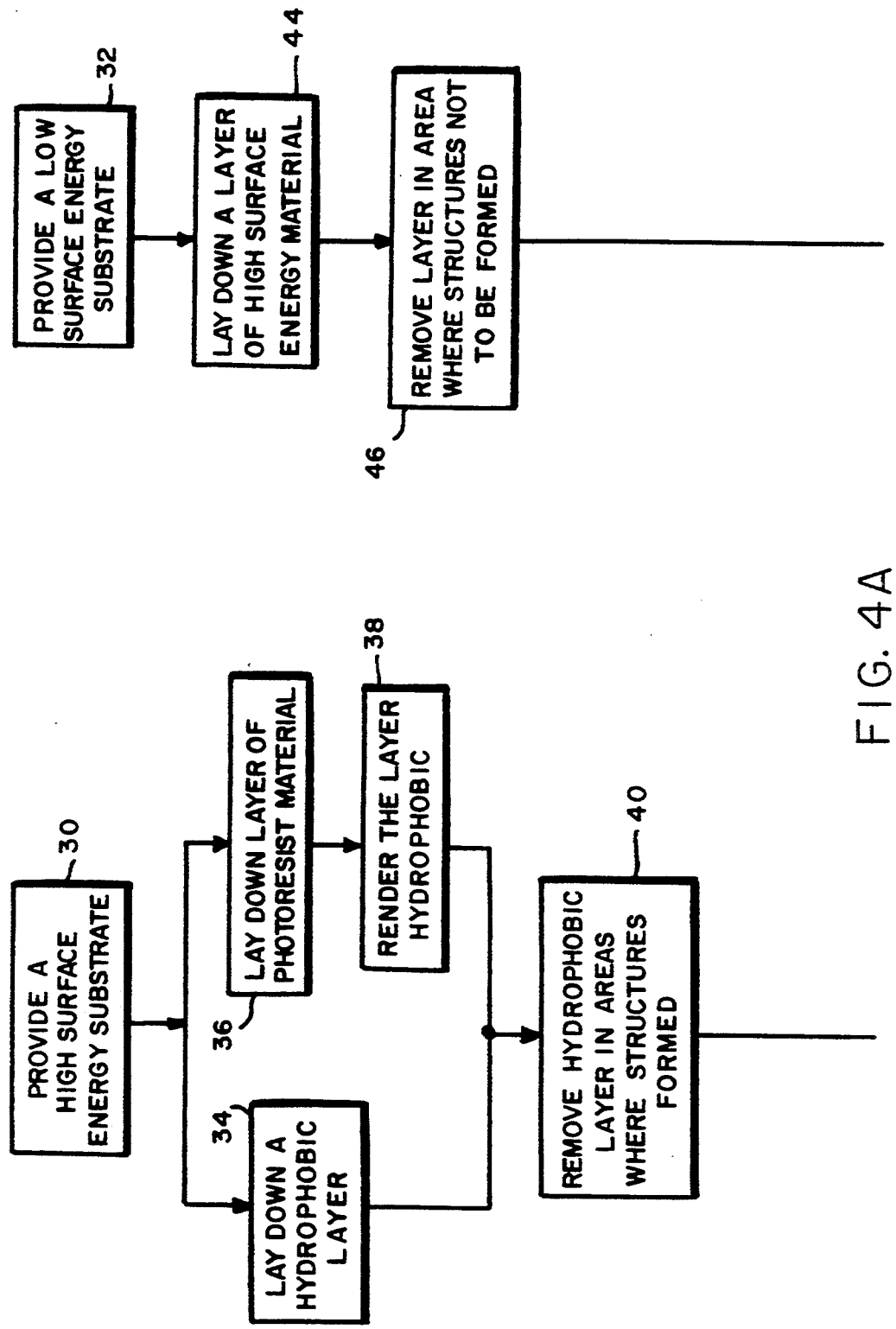
Figure 4B:
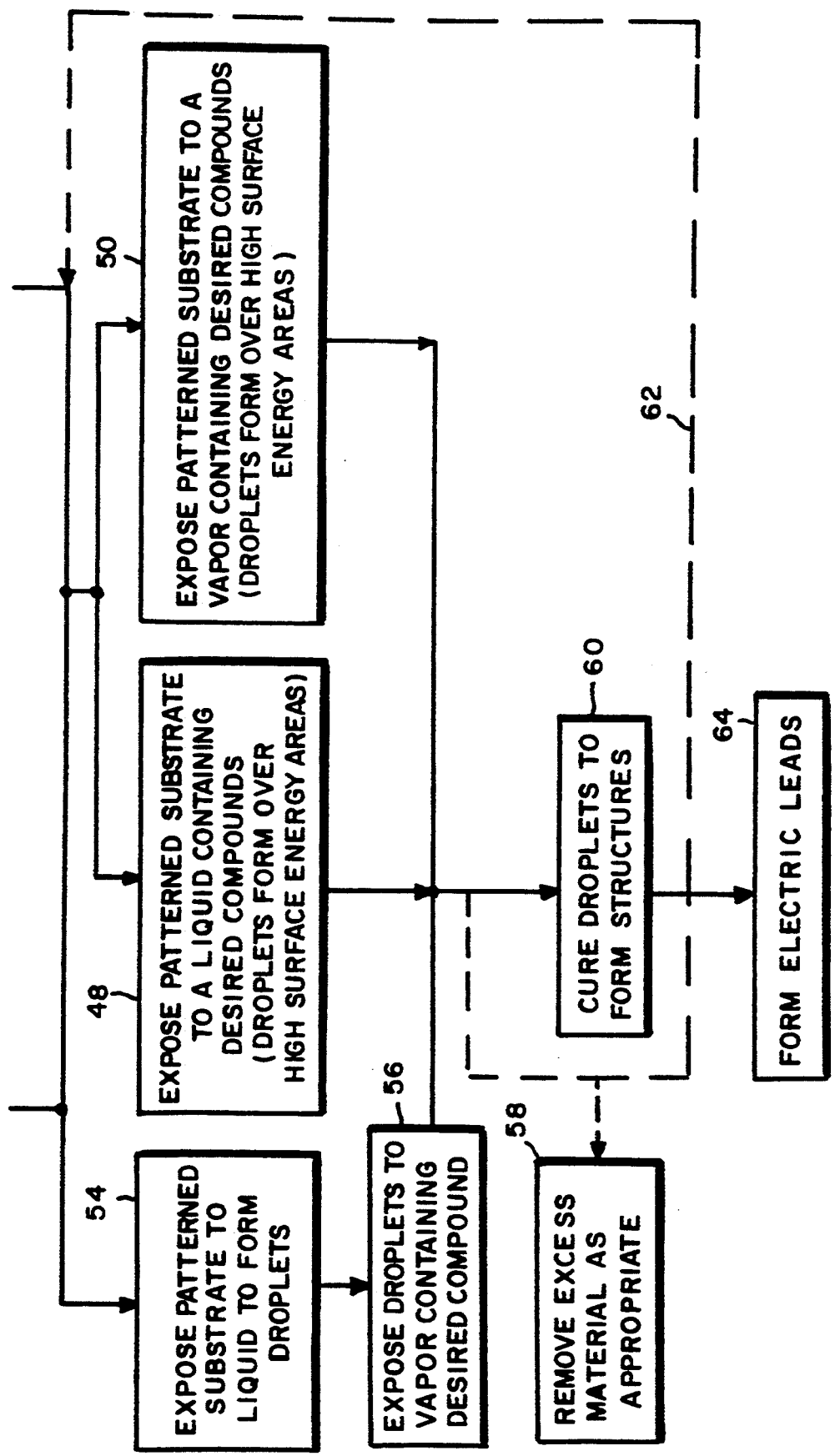

FIGS. 4A and 4B, when combined, form is a flow diagram illustrating the method of forming microstructures on a substrate in accordance with the teachings of this invention, including a number of options in practicing such method.

FIG. 5 (a–d) illustrates diagrammatically various steps in the formation of a microstructure array employing a method of FIGS. 4A and 4B.

DETAILED DESCRIPTION

FIG. 1 shows an illustrative microstructure array 10, which array consists of three dome-shaped microstructures 12, an elliptically-shaped structure 14 and an elongated smoothly curved structure 16, the structures 12, 14 and 16 all being formed on a substrate 18. Substrate 18 is preferably formed of an insulating material which for most optical applications would be transparent. Materials suitable for substrate 18 include glass, fused silica, silicon wafers and many other materials. The materials for the microstructures 12, 14 and 16 will vary with application and may for example be a silicon or metal oxide. More will be said on the materials for the structures and the reasons for selecting particular materials later. While five microstructures of diverse shape are shown for the array 10 in FIG. 1, the microlens or other microstructure array for most applications would consist of a much larger number of lenses or other structures having shapes appropriate for the particular application.

FIG. 2 illustrates an alternative embodiment of the invention, wherein the substrate 20 for the array 10' is a soft contact lens having a curved surface 22 with a plurality of spherical or dome-shaped microscructures 12 formed thereon. Again, only four structures 12 are shown for purposes of illustration, with the exact number and location of the microlenses or structures 12 being determined by the occular defect which the lens is seeking to correct.

FIG. 3 illustrates another embodiment of the invention wherein the array 10" has a plurality of domed or spherical structures 12 formed on substrate 18, the compound for each structure 12 containing an electrically sensitive material. For example, the structures 12 could be formed on an electrochromic material such as tungsten oxide which changes color when a current is applied thereto. In FIG. 3, an electrical lead 24 is shown extending from each structure 12 with each lead 24 terminating at a contact 26 on an edge of the substrate. Contacts 26 may be connected to a source of electrical current by soldering, pressure contact, plug and socket, or other suitable means. The current source for each contact 26 could be selectively energizable to create a desired optical pattern on array 10".

While three illustrative arrays are shown in FIGS. 1–3, these arrays are for purposes of illustration only and, as will be more apparent from the following discussion, numerous other microstructure arrays are possible utilizing the teachings of this invention.

FIGS. 4A and 4B combine to illustrate various embodiments for the method of forming microstructure arrays in accordance with the teachings of this invention. Referring to this figure, the process begins by providing a substrate of the desired size and shape. For most applications, the substrate will be of a high surface energy material such as glass, fused silica, silicon, etc., (step 30), and for most optical applications the substrate material will also be transparent. However, there may be some applications where a low surface energy substrate, for example a substrate formed of or coated with Teflon, may be preferable (step 32).

Where one starts with a high surface energy substrate, the substrate is next coated with a thin layer of a hydrophobic material or of some other low energy material (step 34). Alternatively, a layer of a photoresist or similar material may be applied to the substrate or some other organic polymer may be applied to the substrate (step 36) and the substrate may then be put in a plasma containing fluorine atoms or otherwise treated so as to render at least a top surface of the layer hydrophobic (step 38). The layer applied during step 36 may be otherwise treated to form a layer of a low surface energy material during step 38 where a liquid other than water is used in a later step for forming the droplets. During step 40 the hydrophobic layer (or other low surface energy layer) is removed in areas where structures are to be formed. This removal may be accomplished using standard lithographic or other printed circuit techniques. Steps 34 and 40 are illustrated on lines (a) and (b) of FIG. 5, respectively, where a high surface energy substrate 18 is initially shown coated with a low surface energy layer 42. The layer on the substrate is then patterned during step 40 to expose areas of the high surface energy substrate, the resulting patterned substrate being shown on line (b) of FIG. 5.

Where a low surface energy substrate is initially provided, a layer of high surface energy material, for example a layer of a silicon compound, is laid down during step 44 and this layer is then patterned during step 46 by removing the layer in areas where structures are not to be formed. Thus, the low surface energy substrate is exposed in the areas of the substrate where structures are not to be formed and the high surface energy layer remains in areas where structures are to be formed.

Thus, after step 40 or step 46 there exists a patterned substrate having hydrophobic or other low surface energy material in areas where microstructures are not to be formed and having high surface energy material in areas where microstructures are to be formed. The difference in surface energy between these areas should preferably be maintained as high as possible.

From step 40 or step 46, the operation precedes to either step 48, step 50 or step 54 to form smoothly curved droplets of a suitable compounds over the high surface energy areas of the substrate. This objective is accomplished during step 48 by exposing the patterned substrate to a liquid containing desired compounds. Where the low surface energy surface is hydrophobic, the liquid could be water containing desired compounds such as siloxane or some other similar compound containing tin or tungsten instead of silicon. The compound used may be electrically conductive, semiconductive or insulating depending on application and may also have various optical properties. The liquid forms droplets in the areas of the patterned substrate having high surface energy. For example, referring to line (c) of FIG. 5, with a substrate 18 having high surface energy, the droplets 52 are formed on the substrate over the areas where the hydrophobic or other low surface energy material has been removed.

Step 50 is substantially the same as step 48 except that, rather than the liquid being sprayed or misted onto the substrate, a vapor containing the liquid with the desired compound(s) is either created over the substrate or the substrate is inserted into such a vapor to permit the droplets to be formed.

Steps 54 and 56 are similar to step 48 except that the operation is performed in two steps rather than a single step. Thus, during step 54, the patterned substrate is exposed to a liquid to form the droplets 52, the liquid (such as water) being applied in a mist, spray or the like; and during step 56 the droplets on the substrate are exposed to a vapor of a desired compound, for example a metal halide or a silicon halide. The vapor reacts chemically with the liquid to form, for example, a solid oxide in the shape of the liquid, and any residual products of the reaction, for example hydrogen halide, may be pumped away during step 58. The lead line to step 58 is shown dotted since this step will be required in some instances and not in others. Another situation where step 58 may be required is where, during for example step 50, the compound-containing vapor to which the patterned substrate is exposed is a spun-on-glass, which is a silicon-containing compound in an organic solvent. Glycerol may be added to the spun-on-glass to enhance the surface tension of the liquid. In this situation, the solvent evaporates and is removed during step 58. For each of steps 48, 50 and 54, it is important that the surface energies between different areas on the patterned substrate be relatively large and that the surface tension for the liquid, which is measured in the same units as surface energy, be between the surface energies for the two substrate areas and be such that the liquid substantially adheres only to the high surface energy areas and not to the low surface energy areas. The surface tension of the liquid should also be such as to form smoothly curving droplets over the high surface energy areas. These droplets will have a spherical shape such as that for the structures 12 for circular high surface energy areas in the pattern and will have other shapes such as those of the structures 14 and 16 where the high surface energy area has an oval, elliptical or some other selected shape.

Once the forming of the droplets has been completed, either as a result of step 48, step 50 or step 56, and step 58 being performed to the extent required, the operation proceeds to step 60 to cure or solidify the droplets to obtain the desired microstructures. With a suitable curing agent as part of the compound to which the patterned substrate is exposed, the curing may be accomplished by merely letting the structures harden with time. Alternatively, curing may either be effected or accelerated by use of known curing techniques including baking in an oven or otherwise heating the droplets, suitably irradiating the droplets or by other suitable means.

Once curing step 60 has been completed, there are a number of options for furthering the process. For example, if it is desired to increase the size, and in particular the height, of the structures, for example to increase the aspect ratio thereof, the forming of droplets step (step 48, 50 or 54–56) and curing step 60 may be repeated as illustrated by dotted line 62. These operations may be repeated one or more additional times until microstructures of a desired size and shape are achieved.

Second, if a hydrophobic or other low surface energy layer was utilized so that portions of such layer are still on substrate 18 in areas thereof where there are no structures, the operation may proceed to step 58 to remove this masking material. This may, for example, be accomplished by use of an organic solvent where the domes or other microstructures formed on the substrate are of an inorganic compound. Other techniques known in the art of, for example, printed circuits, may also be utilized for removing this masking material. The array after removal of such masking material is shown on line (d) of FIG. 5.

Finally, if an array such as the array of 10' shown in FIG. 3 is being fabricated, where there is a need to apply electric current or other electric signals to all or selected ones of the microstructures 12, the operation may proceed to step 64 to form leads 24 and contacts 26 on substrate 18. These leads and contacts may be formed using photolithographic or other printed circuit techniques known in the art.

A relatively simple, relatively inexpensive, very flexible process for forming microlens arrays or other microstructure arrays is thus provided, which technique permits the microstructures to be formed on contact lens or other curved surfaces, which permits the structures to assume a variety of smoothly curved shapes and which permits structures of selected size to be formed, including structures having relatively high aspect ratios. Since relying on surface tension of a liquid rather than on some fabrication technique permits very smooth surfaces to be formed, high quality microstructures can be provided, and since the printed circuit techniques utilized to form the areas on the substrate where the structures are to be formed can be performed to submicron size, the technique permits arrays of submicron structures to be fabricated. The technique also permits substantial flexibility in the compounds from which the structures are formed so that such structures may have a variety of desired electrical, optical, or other properties.

While the method shown in FIGS. 4A and 4B and described in conjunction therewith may be controlled manually, a substrate being manually stepped or transferred through the process, the process is preferably performed automatically with suitable substrate handling equipment under control of a programmed computer, hard wiring or a combination thereof. Further, while in the discussion above, various alternatives for the fabrication techniques of this invention have been described and various alternatives for the resulting microstructures have also been described, it is apparent that these techniques and alternative structures and arrays are by way of illustration only and that these and other changes of form and detail may be made in the invention by those skilled in the art without departing from the spirit and the scope of the invention.

What is claimed is:

1. A method for fabricating at least one smoothly curved structure on a substrate comprising the steps of:
   forming a thin film pattern on said substrate having material with a first surface energy in first areas, which areas are to underlie a structure and having material with a second lower surface energy in remaining second areas of said substrate;
   depositing a liquid on the patterned substrate, which liquid has a surface tension which is lower than said first surface energy, but higher than said second surface energy, said liquid adhering primarily to said first areas of the substrate to form a droplet for each of said structures, each droplet having a smoothly curved profile which corresponds to that of a structure, and each droplet containing a selected compound; and
   curing said one or more droplets to form said at least one structure.

2. A method as claimed in claim 1 wherein said curing step includes the step of permitting said droplets to harden over a period of time.

3. A method as claimed in claim 1 wherein said curing step includes the step of heating said droplets.

4. A method as claimed in claim 1 wherein said curing step includes the step of irradiating said droplets with a selected radiation to cure the droplets.

5. A method as claimed in claim 1 wherein said depositing step includes the step of depositing a compound having at least one of selected optical and selected electrical properties.

6. A method as claimed in claim 5 wherein said depositing step includes the step of depositing an electrically conductive compound.

7. A method as claimed in claim 6 including the step of forming a pattern of electrically conducting leads on said substrate to apply current to selected ones of said structures.

8. A method as claimed in claim 1 wherein said forming step includes the step of forming a plurality of said first areas, at least one of which first areas is non-circular.

9. A method as claimed in claim 1 wherein the substrate is formed of the material having the second surface energy, and wherein the forming step includes the step of forming a thin film of material having said first surface energy on said substrate in said first areas.

10. A method as claimed in claim 1 wherein the substrate is formed of the material having the first surface energy, and wherein the forming step includes the step of forming a thin film of material having said second surface energy on said substrate in said second areas.

11. A method as claimed in claim 10 wherein said forming step includes the step of forming a thin film hydrophobic layer on the substrate, which film is patterned to provide non-hydrophobic material in said first areas, and wherein said liquid includes water.

12. A method as claimed in claim 11 including the step, performed after the depositing step, of removing the remaining hydrophobic layer from the substrate.

13. A method as claimed in claim 11 wherein said forming step includes the steps of laying down a thin film of photoresist material on the substrate, rendering the film hydrophobic, and removing the hydrophobic layer over said first area.

14. A method as claimed in claim 11 wherein said forming step includes the step of patterning the thin film by lithography to remove the hydrophobic layer over said first area.

15. A method as claimed in claim 11 wherein the thin film hydrophobic layer is a spun on film of synthetic resin polymer.

16. A method as claimed in claim 11 wherein said depositing step includes the step of providing a vapor to the patterned substrate of a liquid which selectively adheres to film-free areas of the substrate in the form of droplets, and of at least one of a metal halide and a silicon halide, the vapor reacting chemically to form a solid oxide in the shape of said droplets, and removing any remedial halide product.

17. A method as claimed in claim 10 wherein said substrate has a smooth curved surface, and wherein during said forming step, said hydrophobic layer is removed over a plurality of substrate areas.

18. A method as claimed in claim 17 wherein said substrate is a surface of a contact lens, said areas of the substrate being patterned to correct an occular defect.

19. A method as claimed in claim 1 wherein said depositing step includes the steps of exposing the patterned substrate to a silicon containing liquid.

20. A method as claimed in claim 19 wherein said depositing step includes the steps of exposing the patterned substrate to a silicon containing compound in an organic solvent, the compound adhering to film-free areas of the substrate in the form of droplets, and evaporating the solvent.

21. A method as claimed in claim 1 wherein said depositing step includes the step of exposing the patterned substrate to a metal containing liquid.

22. A method as claimed in claim 1 including the step of repeating said depositing and curing steps until said at least one structure is of a desired size and shape.

* * * * *

UNITED STATES PATENT AND TRADEMARK OFFICE
CERTIFICATE OF CORRECTION

PATENT NO. : 5,435,887
DATED     : Jul. 25, 1995
INVENTOR(S) : Mordechai Rothschild and Anthony Forte It is certified that error appears in the above-indentified patent and that said Letters Patent is hereby corrected as shown below:

Column 1, line 3,

The first line under the heading "Field Of The Invention" should read:

This invention was made with government support under Contract No. F19628-90-C-0002 awarded by the Air Force. The government has certain rights in the invention.

Signed and Sealed this

Eighteenth Day of June, 1996

Attest:

BRUCE LEHMAN

Attesting Officer       Commissioner of Patents and Trademarks